United States Patent
Davidson et al.

(10) Patent No.: US 9,196,275 B1
(45) Date of Patent: Nov. 24, 2015

(54) MAGNETIC HEAD SEPARATOR FIN MATERIAL TO PREVENT PARTICULATE CONTAMINATION ON SLIDER

(71) Applicant: Western Digital Technologies, Inc., Irvine, CA (US)

(72) Inventors: Marc Davidson, Sunnyvale, CA (US); David K. Myers, Campbell, CA (US); Terrance J. Willis, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 51 days.

(21) Appl. No.: 14/312,592

(22) Filed: Jun. 23, 2014

Related U.S. Application Data

(60) Provisional application No. 61/951,997, filed on Mar. 12, 2014.

(51) Int. Cl.
*G11B 5/48* (2006.01)
*G11B 5/54* (2006.01)

(52) U.S. Cl.
CPC ... *G11B 5/48* (2013.01); *G11B 5/54* (2013.01)

(58) Field of Classification Search
USPC ............................................ 360/254.7–254.9
See application file for complete search history.

(56) References Cited

U.S. PATENT DOCUMENTS

| | | |
|---|---|---|
| 4,639,811 A | 1/1987 | Diepers et al. |
| 4,652,956 A | 3/1987 | Schewe |
| 4,694,368 A | 9/1987 | Bischoff et al. |
| 4,703,382 A | 10/1987 | Schewe et al. |
| 5,173,826 A | 12/1992 | Bischoff |
| 5,235,482 A | 8/1993 | Schmitz |
| 5,472,736 A | 12/1995 | Barr et al. |
| 5,815,350 A | 9/1998 | Kennedy et al. |
| 5,875,080 A | 2/1999 | Seagle |
| 6,046,889 A | 4/2000 | Berding et al. |
| 6,052,890 A | 4/2000 | Malagrino, Jr. et al. |
| 6,061,206 A | 5/2000 | Foisy et al. |
| 6,084,753 A * | 7/2000 | Gillis et al. .................... 360/128 |
| 6,101,876 A | 8/2000 | Brooks et al. |
| 6,147,831 A | 11/2000 | Kennedy et al. |
| 6,151,189 A | 11/2000 | Brooks |
| 6,151,197 A | 11/2000 | Larson et al. |
| 6,160,686 A | 12/2000 | Albrecht et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,215,616 B1 | 4/2001 | Phan et al. |
| 6,246,541 B1 | 6/2001 | Furuichi et al. |
| 6,272,694 B1 | 8/2001 | Knoth |
| 6,288,866 B1 | 9/2001 | Butler et al. |
| 6,292,333 B1 | 9/2001 | Blumentritt et al. |
| 6,333,830 B2 | 12/2001 | Rose et al. |
| 6,344,950 B1 | 2/2002 | Watson et al. |

(Continued)

*Primary Examiner* — Wayne Young
*Assistant Examiner* — Carlos E Garcia

(57) ABSTRACT

An apparatus for a magnetic storage drive includes a magnetic head assembly having a first slider and a second slider arranged with a gap between the first and second sliders, the first slider comprising a first magnetic head and the second slider comprising a second magnetic head. The apparatus includes a ramp constructed of a first material, the ramp being configured to guide and hold the magnetic head assembly in place when parked; and a fin constructed of a second material different than the first material, the fin arranged with the ramp to protect the first slider from contacting the second slider when the magnetic head assembly is parked on the ramp.

24 Claims, 4 Drawing Sheets

(56) References Cited

U.S. PATENT DOCUMENTS

| | | |
|---|---|---|
| 6,349,014 B1 | 2/2002 | Crue, Jr. et al. |
| 6,349,464 B1 | 2/2002 | Codilian et al. |
| 6,388,873 B1 | 5/2002 | Brooks et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,466,404 B1 | 10/2002 | Crue, Jr. et al. |
| 6,469,871 B1 | 10/2002 | Wang |
| 6,487,051 B1 | 11/2002 | Koyanagi et al. |
| 6,502,300 B1 | 1/2003 | Casey et al. |
| 6,519,116 B1 | 2/2003 | Lin et al. |
| 6,525,901 B1 | 2/2003 | Kamijima et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,654,202 B2 | 11/2003 | Rea et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,861,937 B1 | 3/2005 | Feng et al. |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,006,327 B2 | 2/2006 | Krounbi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,116,517 B1 | 10/2006 | He et al. |
| 7,126,788 B1 | 10/2006 | Liu et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |

(56) References Cited

U.S. PATENT DOCUMENTS

| | | |
|---|---|---|
| 7,209,319 B1 | 4/2007 | Watkins et al. |
| D542,289 S | 5/2007 | Diebel |
| 7,212,377 B1 | 5/2007 | Ou-Yang et al. |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,248,441 B2 | 7/2007 | Chang et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,355,816 B1 | 4/2008 | Hiller |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,386,933 B1 | 6/2008 | Krounbi et al. |
| 7,388,731 B1 | 6/2008 | Little et al. |
| 7,420,771 B1 | 9/2008 | Hanke et al. |
| 7,430,098 B1 | 9/2008 | Song et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,573,682 B2 | 8/2009 | Pust et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 7,974,046 B2 | 7/2011 | Ota et al. |
| 7,986,496 B2 | 7/2011 | Ohta et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,035,920 B2 | 10/2011 | Na et al. |
| 8,035,921 B2 | 10/2011 | Sunwoo |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,218,264 B1 | 7/2012 | Sasaki et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,300,357 B1 | 10/2012 | Sasaki et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,166 B1 | 4/2013 | Sasaki et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,514,517 B1 | 8/2013 | Batra et al. |
| 8,530,032 B1 | 9/2013 | Sevier et al. |
| 8,535,792 B2 | 9/2013 | Lowery et al. |
| 8,542,465 B2 | 9/2013 | Liu et al. |
| 8,547,659 B1 | 10/2013 | Bai et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |

(56) References Cited

U.S. PATENT DOCUMENTS

| | | | |
|---|---|---|---|
| 8,760,800 B1 | 6/2014 | Brown et al. | |
| 8,760,814 B1 | 6/2014 | Pan et al. | |
| 8,760,816 B1 | 6/2014 | Myers et al. | |
| 8,773,812 B1 | 7/2014 | Gustafson et al. | |
| 8,780,491 B1 | 7/2014 | Perlas et al. | |
| 8,780,504 B1 | 7/2014 | Teo et al. | |
| 8,786,983 B1 | 7/2014 | Liu et al. | |
| 8,792,205 B1 | 7/2014 | Boye-Doe et al. | |
| 8,797,677 B2 | 8/2014 | Heo et al. | |
| 8,797,684 B1 | 8/2014 | Tran et al. | |
| 8,797,689 B1 | 8/2014 | Pan et al. | |
| 8,824,095 B1 | 9/2014 | Dougherty | |
| 8,824,098 B1 | 9/2014 | Huang et al. | |
| 2004/0120071 A1* | 6/2004 | Akama et al. | 360/97.02 |
| 2004/0169958 A1 | 9/2004 | Krounbi et al. | |
| 2005/0024765 A1 | 2/2005 | Han et al. | |
| 2005/0052771 A1 | 3/2005 | Rausch et al. | |
| 2008/0204925 A1* | 8/2008 | Ohta et al. | 360/75 |
| 2008/0316646 A1 | 12/2008 | Na et al. | |
| 2011/0212281 A1 | 9/2011 | Jacoby et al. | |
| 2011/0273797 A1 | 11/2011 | Biskeborn et al. | |
| 2012/0075750 A1* | 3/2012 | Chan et al. | 360/294 |
| 2013/0038964 A1 | 2/2013 | Garbarino et al. | |
| 2013/0091698 A1 | 4/2013 | Banshak, Jr. et al. | |
| 2013/0155546 A1 | 6/2013 | Heo et al. | |
| 2013/0170069 A1* | 7/2013 | Ono et al. | 360/75 |
| 2013/0290988 A1 | 10/2013 | Watson et al. | |

\* cited by examiner

MAGNETIC HEAD SEPARATOR FIN MATERIAL TO PREVENT PARTICULATE CONTAMINATION ON SLIDER

CROSS-REFERENCE TO RELATED APPLICATION

This application claims the benefit of U.S. Provisional Application Ser. No. 61/951,997 filed on Mar. 12, 2014, which is expressly incorporated by reference herein in its entirety.

BACKGROUND

A hard disk drive includes a rotatable storage disk, with magnetic reader heads and writer heads that can be placed in park when the device is not actively reading or writing. A head assembly of reader and writer heads is positioned on a slider, which is a base substrate structure for the head assembly. A ramp is a structure designed to guide and seat a suspension arm for the head assembly when parking. An armature holding the head assembly rotates to an end position toward the ramp, allowing a tip assembly to engage with the ramp, with the head assembly kept at a clearance gap from the ramp. While in park, an opposing slider and head assembly, used for reading and writing on the opposite side of the storage disk, resides below the first slider and head assembly. In order to protect the opposing sliders from clashing with each other upon a shock event (e.g., if the device is dropped or bumped during or after assembly), a separator fin extends outward from the ramp into the space between the parked sliders. However, while the fin protects the top slider from contacting and damaging the bottom slider, small shock events may bring the top and/or the bottom slider into contact with the fin. This contact may leave debris deposits, such as particulate residue, from the fin material onto the slider, and may cause smearing on the slider. This residue and smearing may lead to contamination-related failures of the magnetic reader and writer heads.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
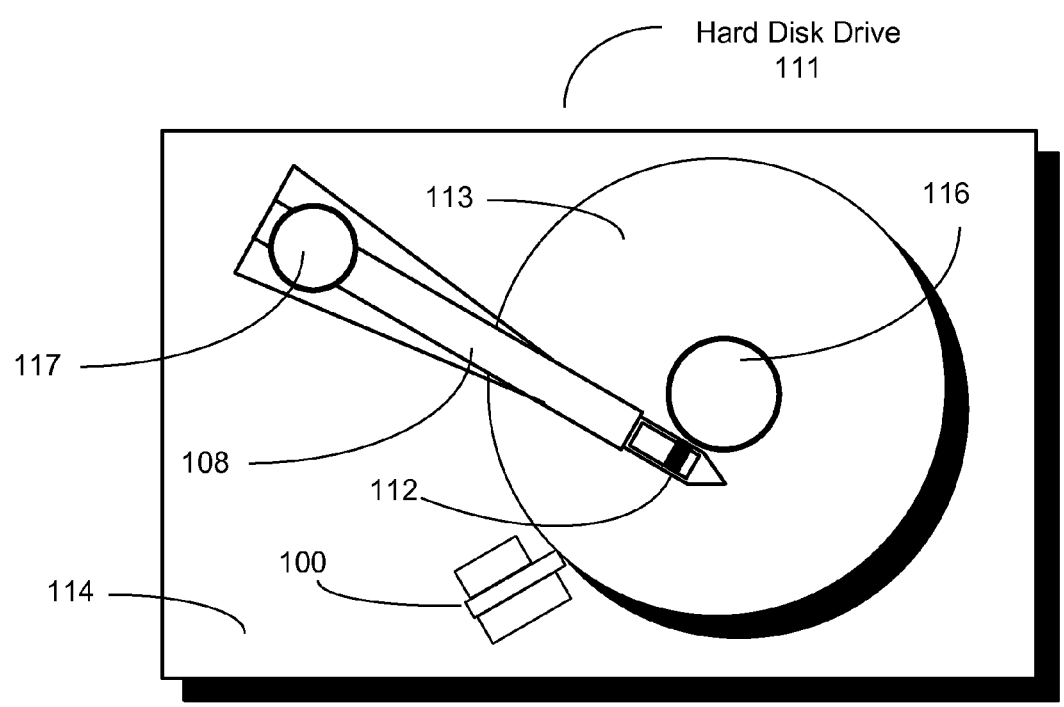
FIG. 1 shows a diagram of an exemplary hard disk drive.

The detailed description set forth below in connection with the appended drawings is intended as a description of various exemplary embodiments and is not intended to represent the only embodiments that may be practiced. The detailed description includes specific details for the purpose of providing a thorough understanding of the embodiments. However, it will be apparent to those skilled in the art that the embodiments may be practiced without these specific details. In some instances, well-known structures and components are shown in block diagram form in order to avoid obscuring the concepts of the embodiments. Acronyms and other descriptive terminology may be used merely for convenience and clarity and are not intended to limit the scope of the embodiments.

The various exemplary embodiments illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various embodiments will be described herein with reference to drawings that are schematic illustrations of idealized configurations. As such, variations from the shapes of the illustrations as a result of manufacturing techniques and/or tolerances, for example, are to be expected. Thus, the various embodiments presented throughout this disclosure should not be construed as limited to the particular shapes of elements illustrated and described herein but are to include deviations in shapes that result, for example, from manufacturing. By way of example, an element illustrated or described as having rounded or curved features at its edges may instead have straight edges. Thus, the elements illustrated in the drawings are schematic in nature and their shapes are not intended to illustrate the precise shape of an element and are not intended to limit the scope of the described embodiments.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments include the described components, structure, features, functionality, processes, advantages, benefits, or modes of operation.

As used herein, the term "about" followed by a numeric value means within engineering tolerance of the provided value.

In the following detailed description, various aspects of the present invention will be presented in the context of a ramp assembly used to park a magnetic head assembly when idle in a disk-based storage device, such as a hard disk drive (HDD) or a solid state hybrid drive (SSHD).

An aspect of a ramp apparatus includes a ramp body constructed of a first material, the ramp being configured to guide and hold a magnetic head assembly in place when parked, and a fin being formed with a second material different than the first material. The fin is arranged with the ramp to protect a top magnetic head assembly from contacting a bottom magnetic head assembly during a shock event when parked on the ramp.

FIG. 1 shows a hard disk drive 111 including a disk drive base 114, at least one rotatable storage disk 113 (such as a magnetic disk, magneto-optical disk, or optical disk), and a spindle motor 116 attached to the base 114 for rotating the disk 113. The spindle motor 116 typically includes a rotating hub on which one or more disks 113 may be mounted and clamped, a magnet attached to the hub, and a stator. At least one suspension arm 108 supports at least one head gimbal assembly (HGA) 112 that holds a slider with a magnetic head assembly of writer and reader heads. A ramp assembly 100 is affixed to the base 114, and provides a surface for tip of the suspension arm 108 to rest when the HGA 112 is parked (i.e., when the writing and reading heads are idle). During a recording operation of the disk drive 111, the suspension arm 108 rotates at the pivot 117, disengaging from the ramp assembly 100, and moves the position of the HGA 112 to a desired information track on the rotating disk 113. A typical hard disk drive 111 uses double sided disks 113 to allow read/write operation on both sides of the disk 113. As such, a second, opposing HGA 112 supported by a second suspension arm 108 (both are not visible in FIG. 1) may be arranged on the underside of the disk 113. The bottom of the ramp 100 may be configured with a surface that accepts the tip of the second suspension arm 108 when the second HGA 112 is parked.

Figure 2:
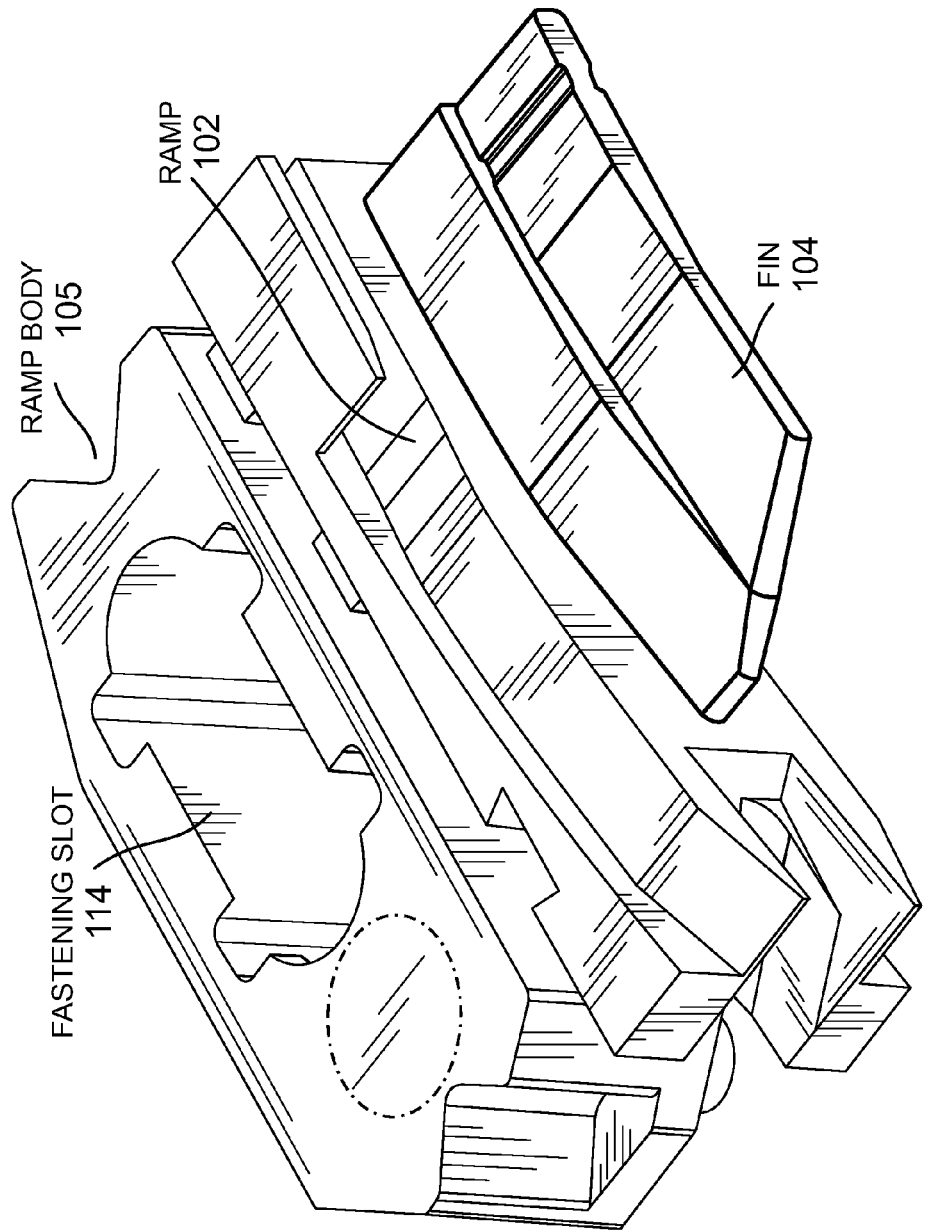
FIG. 2 shows a diagram of an exemplary ramp assembly with a fin structure composed of a different material.

FIG. 2 shows a diagram of an exemplary ramp assembly 100, having a ramp body 105 with a ramp 102 and a fastening slot 114. The ramp assembly 100 also includes a fin 104, which is a means for protecting opposing sliders from contacting each other when the sliders and magnetic head assemblies are parked on the ramp. The fin 104 is a protruding structure that extends from the ramp body 105 in a suspended position between the opposing sliders when parked. As shown in FIG. 2, the fin 104 may be configured in a rectangular shape and a thin vertical profile which conforms to the space between the sliders and the boundaries of the suspended slider position. The relative position of the fin 104 to the sliders will be explained in further detail below with respect to FIG. 3 and FIG. 4.

The material composition of the ramp body 105 may be a durable and resilient plastic material having a hardness suitable for a rigid base to support one or more HGAs 112 and respective suspension arms 108. Also, the ramp body 105 material composition should have a coefficient of friction low enough to permit free and unhindered sliding of the tip of suspension arm 108 on and off of the ramp 102 for entering and leaving the parked position. For example, the material composition of the ramp body 105 may be polyoxymethylene (POM). The material composition of the ramp body 105 may be either POM alone, or a compound that is primarily POM.

The material composition of the fin 104 may be a plastic material selected according to predetermined thresholds hardness, durability, and low material transfer (e.g., residue smearing) on contact. Additional criteria for the material may include a hardness value below a maximum hardness threshold to avoid chipping the slider during a shock event or generating debris from reinforcing fillers or fibers or the main plastic material. For example, the material formulations for the fin 104 may exhibit hardness in a range of about 95-130 (Rockwell M), and a tensile modulus higher than about 2.5 GPa with a limit at about 10 GPa.

In one embodiment, the material composition of the ramp body is different than the material composition of the fin 104. For example, the ramp body 105 may be constructed of POM, and the fin 104 may be constructed of a material that is substantially free of POM, such as polyetherimide (PEI). In this example, the ramp assembly 100 may be fabricated in a two shot mold injection process for a POM based ramp body 105 and a PEI based fin 104. Alternative materials for the fin 104 material composition may include any one of the following: polyetheretherketone (PEEK), polyphenylene sulfide (PPS), polyethersulfone (PES), polyimide, polyamide-imide.

The ramp body 105 and fin 104 may be affixed to each other in any one of various techniques, including but not limited to fusion bonding, solvent bonding, ultrasonic boding, a mechanical fastener, or fastening elements formed into each part (e.g., threaded elements, detents, etc.).

Figure 3:
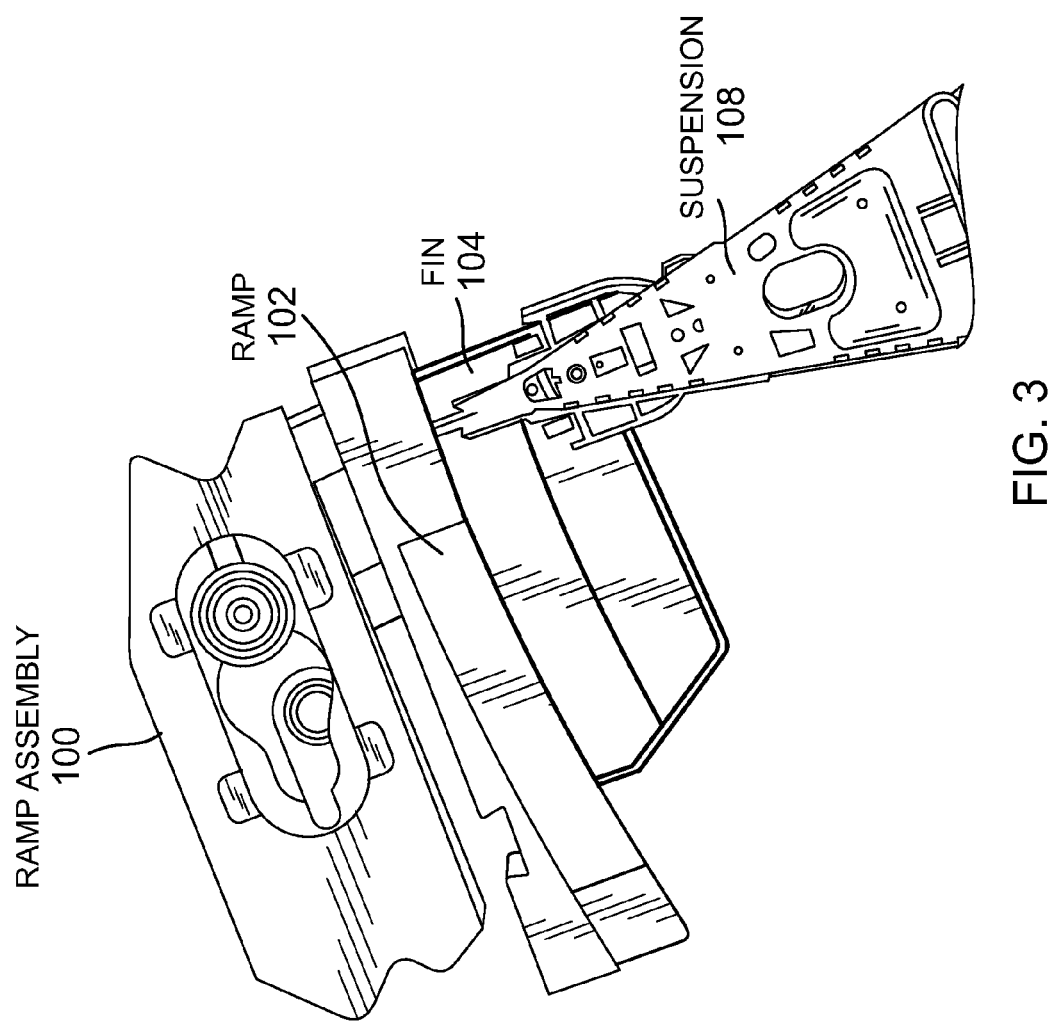
FIG. 3 shows a top view detail of an exemplary ramp assembly with a fin structure in a relative position with a parked suspension arm of a head gimbal assembly.

FIG. 3 shows a top view of the ramp assembly 100 with the suspension arm 108 parked on the ramp 102. The slider (not visible) is affixed to the head gimbal assembly which is supported by the suspension arm 108. The slider is suspended just above the surface of the fin 104 with a small clearance. The suspension arm 108 slides to the left to leave the parked position, and slides back over the ramp 102 to return to the parked position as shown. As shown in FIG. 3, the fin 104 may be configured with a shape that conforms to the adjacent ramp 102 for providing protection between the opposing sliders along the length of the ramp 102 as the suspension 108 approaches and departs the ramp 102. The length of the fin 104 may be approximately equivalent to the length of the ramp 102, with a minimum length corresponding to the boundary of the suspended sliders when parked.

Figure 4:
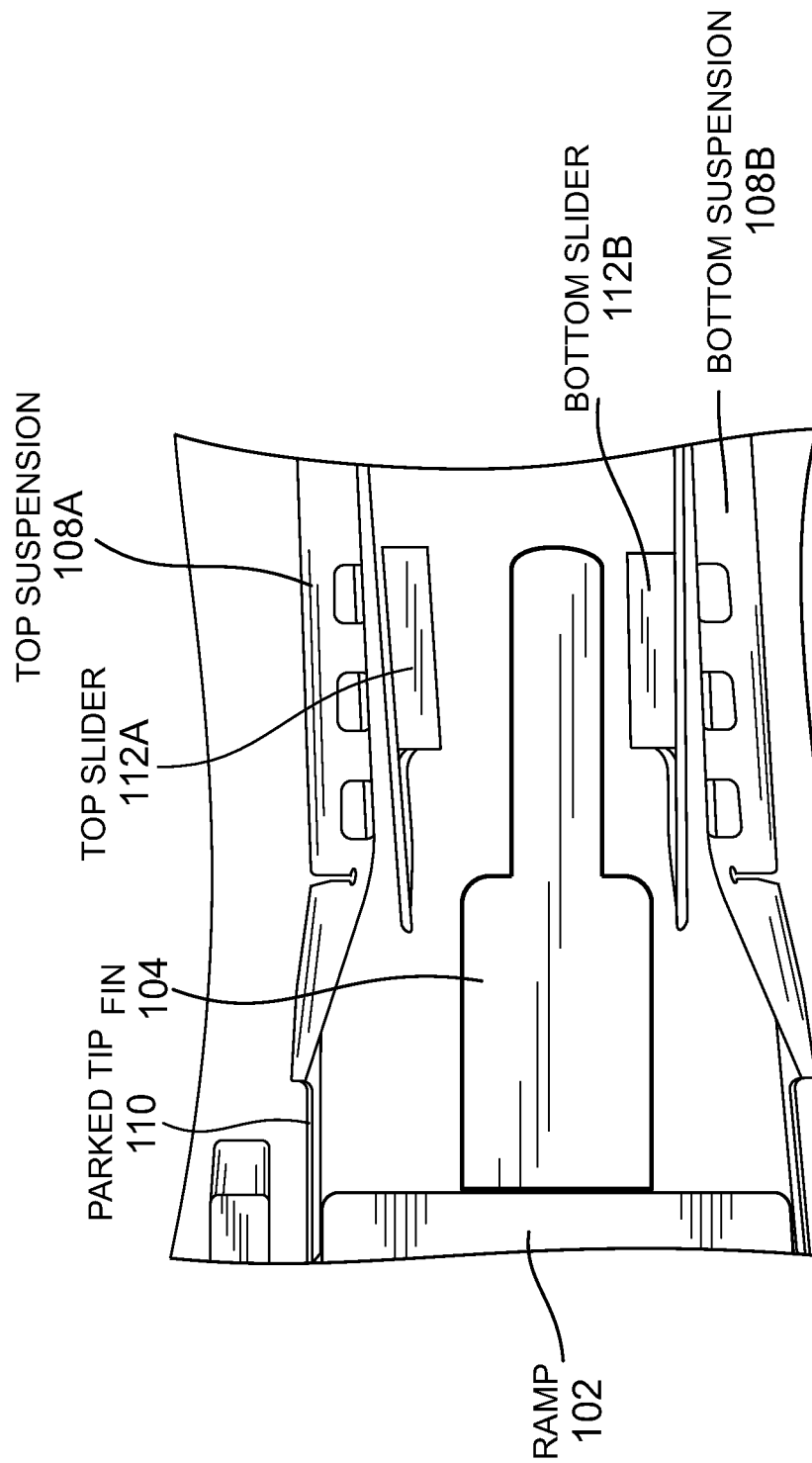
FIG. 4 shows a side view detail of an exemplary ramp assembly and fin arranged between top and bottom sliders in a parked position on the ramp.

FIG. 4 shows a side view of the same ramp assembly 100 as shown in FIG. 3 with the suspension arm 108 parked on the ramp 102. In this view as shown in FIG. 4, both the top suspension arm 108A and bottom suspension arm 108B are visible. Also shown is the parked tip 110 of the suspension arm 108A, which rests on the surface of ramp 102. The fin 104 is arranged between the top slider 112A and the bottom slider 112B, which prevents two sliders from contacting each other during a shock event while in the parked position. The fin 104 may be configured with a width (i.e., the dimension extending out perpendicular and away from the ramp 102) that corresponds with the boundary of the suspended sliders 112A and 112B, which are shown suspended from suspension arm 108. The fin 104 may also be configured with a maximum thickness that provides clearance for the sliders 112A and 112B to pass above and below the fin 104 when being parked by the suspension arms 108A and 108B without contacting the fin 104, and a minimum thickness that provides adequate sturdiness to protect the sliders upon contact with the fin 104 during a shock event.

With the fin 104 positioned as shown in FIG. 4, the top slider 112A or the bottom slider 112B, or both, may contact the fin 104 in response to a vibration or shock event to the hard disk drive assembly 111 (e.g., external forces from the environment, such as a bump to the hard disk drive 111 during manufacturing, assembly, or operation), thus protecting against direct slider to slider contact. Constructing the fin 104 with a non-POM material, the top slider 112A and the bottom slider 112B may remain free from deposits, such as particulate residue, from the fin 104 material onto the sliders 112A, 112B, or substantially free of such deposits, for an extended service life of the read and write heads on sliders 112A and 112B.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. An apparatus for a magnetic storage drive comprising a magnetic head assembly having a first slider and a second slider arranged with a gap between the first and second sliders, the first slider comprising a first magnetic head and the second slider comprising a second magnetic head, the apparatus comprising:
- a ramp constructed of a first material, the ramp being configured to guide and hold the magnetic head assembly in place when parked; and
- a fin constructed of a second material different than the first material, the fin coupled to the ramp and arranged between the first slider and the second slider to protect the first slider from contacting the second slider while maintaining a clearance to each of the first slider and the second slider when the magnetic head assembly is parked on the ramp.

2. The apparatus of claim 1, wherein the second material is substantially free of polyoxymethylene.

3. The apparatus of claim 1, wherein the second material has a hardness in a range of about 95-130 Rockwell M.

4. The apparatus of claim 1, wherein the second material has a tensile modulus greater than about 2.5 GPa and less than about 10 GPa.

5. The apparatus of claim 1, wherein the second material comprises a polyetherimide (PEI) material.

6. The apparatus of claim 1, wherein the second material comprises a polyetheretherketone (PEEK) material.

7. The apparatus of claim 1, wherein the second material comprises a polyphenylene sulfide (PPS) material.

8. The apparatus of claim 1, wherein the second material comprises a polyethersulfone (PES) material.

9. The apparatus of claim 1, wherein the second material comprises a polyimide material.

10. The apparatus of claim 1, wherein the second material comprises a polyamide-imide material.

11. The apparatus of claim 1, wherein the fin extends from the ramp along a gap between the first slider and the second slider when the magnetic head assembly is parked on the ramp.

12. An apparatus for a magnetic storage drive comprising a magnetic head assembly having a first slider and a second slider arranged with a gap between the first and second sliders, the first slider comprising a first magnetic head and the second slider comprising a second magnetic head, the apparatus comprising:
- a ramp constructed of a first material and configured to guide and hold the magnetic head assembly in place when parked; and
- means for protecting the first slider from contacting the second slider, the means for protecting being arranged between the first slider and the second slider while maintaining a clearance to each of the first slider and the second slider when the magnetic head assembly is parked on the ramp;
- wherein the means for protecting is constructed of a second material different than the first material.

13. The apparatus of claim 12, wherein the second material comprises material substantially free of polyoxymethylene.

14. The apparatus of claim 12, wherein the second material comprises material having a hardness in a range of about 95-130 Rockwell M.

15. The apparatus of claim 12, wherein the second material comprises material having a tensile modulus greater than about 2.5 GPa and less than about 10 GPa.

16. The apparatus of claim 12, wherein the second material comprises a polyetherimide (PEI) material.

17. The apparatus of claim 12, wherein the second material comprises a polyetheretherketone (PEEK) material.

18. The apparatus of claim 12, wherein the second material comprises a polyphenylene sulfide (PPS) material.

19. The apparatus of claim 12, wherein the second material comprises a polyethersulfone (PES) material.

20. The apparatus of claim 12, wherein the second material comprises a polyimide material.

21. The apparatus of claim 12, wherein the second material comprises a polyamide-imide material.

22. The apparatus of claim 12, wherein the means for protecting extends from the ramp along a gap between the first slider and the second slider when the magnetic head assembly is parked on the ramp.

23. A magnetic storage drive, comprising:
- a rotatable storage disk;
- a first slider with a first magnetic head assembly and a second slider with a second magnetic head assembly arranged with a gap between the first and second sliders for allowing passage across opposing sides of the storage disk, the first slider comprising a first magnetic head and the second slider comprising a second magnetic head;
- a ramp constructed of a first material, the ramp being configured to guide and hold the first magnetic head assembly and the second magnetic head assembly in place when parked; and
- a fin constructed of a second material different than the first material, the fin coupled to the ramp and arranged between the first slider and the second slider to protect the first slider from contacting the second slider while maintaining a clearance to each of the first slider and the second slider when the first magnetic head assembly and the second magnetic head assembly are parked on the ramp.

24. An apparatus for a magnetic storage drive comprising a magnetic head assembly having a first slider and a second slider arranged with a gap between the first and second sliders, the first slider comprising a first magnetic head and the second slider comprising a second magnetic head, the apparatus comprising:
- a ramp constructed of a first material, the ramp being configured to guide and hold the magnetic head assembly in place when parked; and
- a fin constructed of a second material different than the first material, the fin coupled to the ramp and arranged between the first slider and the second slider to protect the first slider from contacting the second slider when the magnetic head assembly is parked on the ramp, wherein the second material is substantially free of polyoxymethylene.

* * * * *